United States Patent [19]

Fletcher et al.

[11] Patent Number: 5,341,824

[45] Date of Patent: Aug. 30, 1994

[54] METHOD AND APPARATUS FOR INSPECTING AND CONTROLLING TIPPING PAPER PERFORATION

[75] Inventors: Thomas A. Fletcher, Chesterfield; H. Cary Longest, Jr., Midlothian, both of Va.

[73] Assignee: Philip Morris Incorporated, New York, N.Y.

[21] Appl. No.: 998,034

[22] Filed: Dec. 29, 1992

[51] Int. Cl.⁵ .............................. A24C 5/34; A24C 5/00
[52] U.S. Cl. ...................................... 131/281; 131/905
[58] Field of Search ............... 131/281, 905, 906, 908, 131/910; 219/121.7, 121.71, 121.62, 384; 83/30; 356/429–431

[56] References Cited

U.S. PATENT DOCUMENTS

| | | |
|---|---|---|
| 4,047,421 | 9/1977 | Spiers et al. . |
| 4,121,595 | 10/1978 | Heitmann et al. . |
| 4,193,409 | 3/1980 | Wahle et al. . |
| 4,218,606 | 8/1980 | Whitman, III ............... 219/121.7 X |
| 4,246,775 | 1/1981 | Stutz . |
| 4,495,796 | 1/1985 | Hester et al. . |
| 4,563,228 | 1/1986 | Luders et al. ...................... 83/30 X |
| 4,569,359 | 2/1986 | Nowers et al. . |
| 4,641,256 | 2/1987 | Marchegiano et al. . |
| 4,648,412 | 3/1987 | Heitmann . |
| 4,911,028 | 3/1990 | Stevens et al. . |
| 5,068,799 | 11/1991 | Jarrett, Jr. . |
| 5,092,350 | 3/1992 | Arthur et al. . |
| 5,118,195 | 6/1992 | Dobbie . |

OTHER PUBLICATIONS

R. W. Dwyer, K. A. Cox, and J. E. Bickett, "*Sources of Pressure–Drop and Ventilation Variability in Cigarettes*", in Recent Advances in Tobacco Science vol. 13, ed. Dale E. Mathis, (Greensboro, N.C.: Tobacco Chemists Research Conference, 1987), pp. 82–118.

*Primary Examiner*—Jennifer Bahr
*Attorney, Agent, or Firm*—Burns, Doane, Swecker & Mathis

[57] ABSTRACT

The perforation of tipping paper on a high-speed perforation line is monitored and controlled by an electro-optic detection and data processing system which produces a signal related in value to an expected pressure drop through the paper based on calculations relating the inverse square of average perforation area to pressure drop. In one embodiment, a strobe light and camera are arranged on opposite sides of the tipping paper strip and provide an image signal to a vision processor. In another embodiment, a CCD line sensor located across the width of the strip is scanned to provide a signal related to a profile of light transmitted through the tipping paper.

25 Claims, 4 Drawing Sheets

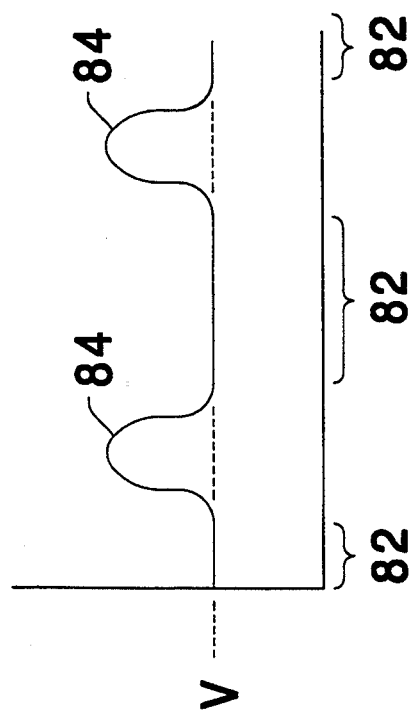
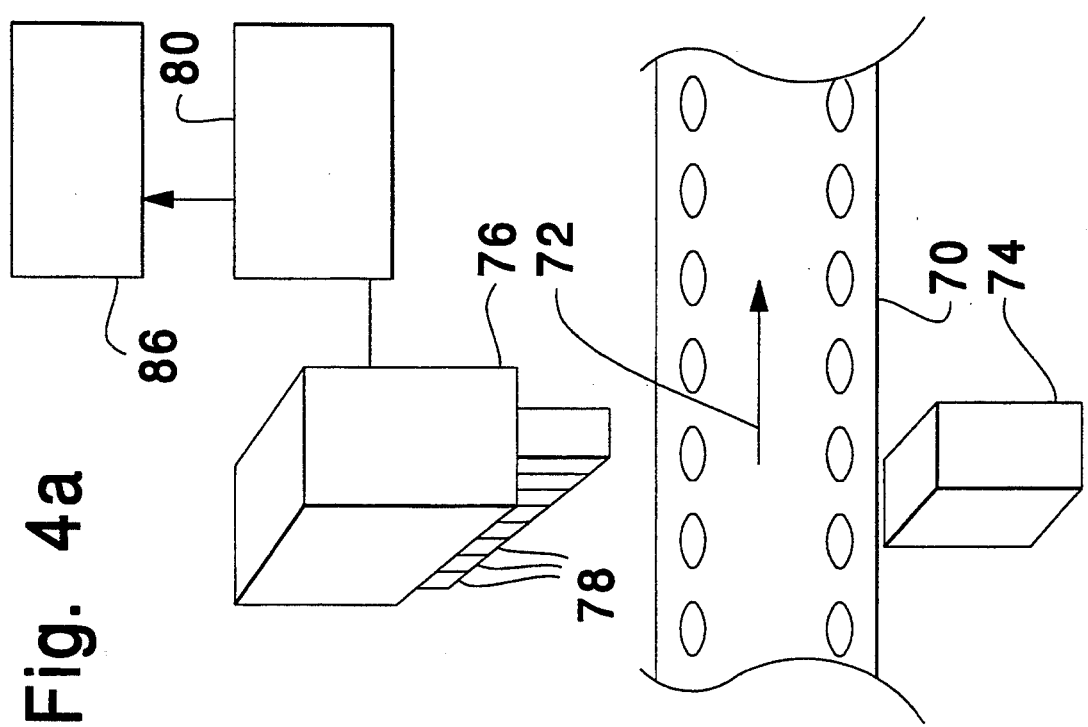

METHOD AND APPARATUS FOR INSPECTING AND CONTROLLING TIPPING PAPER PERFORATION

FIELD OF THE INVENTION

The present invention relates to systems for producing perforated paper, especially, systems for inspecting and perforating cigarette tipping paper.

BACKGROUND

Tipping paper is employed to wrap cigarettes or other smoking products. Holes or perforations are formed in the tipping paper to allow cool atmospheric air to enter the tobacco smoke stream. Known methods of perforating tipping paper include pinned roller perforators and laser perforators. These systems may form lines of perforations in an elongated tipping paper strip or web, for example, at a frequency of 50 holes per inch.

The size and spacing of the holes or perforations in the tipping paper determine its permeability to the air and effect the degree of dilution of the smoke with atmospheric air. It is desirable to provide a constant permeability or dilution for particular types or brands of smoking products.

It is known to control laser perforators in response to permeability measurements made. See U.S. Pat. Nos. 4,569,359; 4,121,595, 4,648,412 and 5,092,350. Known permeability measuring devices include pneumatic systems for measuring the pressure drop through the tipping paper. However, such pneumatic systems are frequently inaccurate and difficult to implement in a high volume production line where the web can travel through the perforator at speeds of 5000 to 6000 ft. per minute.

Pneumatic measurements are frequently made off-line on a sample basis. In some prior art production lines, quality monitoring and control are accomplished through a combination of sampling and perforator adjustments. Initial setup can be accomplished by iterative trial and error in which the focus and power settings of the laser perforator are adjusted. After making tentative settings, the line is run to generate samples. The resulting samples are then tested in a pneumatic pressure drop instrument gage. Once the desired operating results are achieved, a manufacturing inspector periodically samples the perforated product, for example, a sample could be taken of five foot sections of paper from the end of every third bobbin to check for correct pressure drop. The paper could also be inspected by visual monitoring by holding the paper up to light to check generally for hole position and size. However, since such measurements are neither continuous nor in real time, defective perforation, if detected at all, would be determined after a large quantity of tipping paper has been perforated.

Optical monitoring devices for tipping paper perforation lines are also known. U.S. Pat. No. 4,569,359 includes a brief mention of optical monitoring. A known optical system for monitoring a perforation line is illustrated in FIG. 3 and described below. While such a system permits on-line monitoring of the process, in practice the output signal from this system has been found to correlate poorly with the pressure drops measured directly with pneumatic systems. Moreover, the system is affected by variations in the paper base sheet such as splices, extraneous holes, or thickness changes.

OBJECT AND SUMMARY OF PREFERRED EMBODIMENTS

Accordingly it is a primary object of the present invention to provide a method and apparatus for accurately monitoring pressure drop of a web or strip of tipping paper moving rapidly through a production line.

It is a further object of the present invention to use optical measurements, correlated to pressure drop, to continuously control a tipping paper perforator and thereby correct for variation from a desired pressure drop specification in real time.

It is a further object of the present invention to monitor perforated tipping paper and detect variations in perforation length, width and spacing.

It is a further object of the present invention to monitor perforated tipping paper and separately determine perforation area and variation in the paper base sheet.

These and other objects are accomplished by a system for controlling a tipping paper perforator constructed in accordance with the preferred embodiments disclosed here. Such a system includes an electro-optic device for optically monitoring the perforations in tipping paper downstream of a perforator. In a preferred embodiment the optical monitoring apparatus includes a strobe light for intermittently illuminating a portion of the perforated tipping paper as it moves continuously past the apparatus. A camera, preferably a CCD camera, provides image data for perforations in a portion of the tipping paper illuminated by the strobe light. A vision processing circuit determines the average area of perforations in the tipping paper. An output signal of the vision processing circuit is applied to a general or special purpose computer which calculates an expected pressure drop of the paper using the area determined for the perforations by the vision processing system. The computer may provide a control or feedback signal to the tipping paper perforator in order to adjust the operation of the perforator.

Applicant's have determined that the expected pressure drop calculated using the area determined in the above manner, correlates well with actual measured pressure drop i.e., pressure drop measured directly using pneumatic techniques. The expected pressure drop may be calculated using an equation relating expected pressure drop to the inverse square of measured average perforation area.

In a preferred embodiment of the present invention, the strobe light and camera are located on opposite sides of the tipping paper and the camera detects light transmitted through the perforations in the tipping paper. Advantageously, the strobe light produces light pulses of sufficiently short duration to freeze the motion of the running tipping paper strip. In production line environments where the speed of the tipping paper strip may be as great as 6,000 ft. per minute, a 450 nanosecond pulse width has been found acceptable. A fiber optic cable may be provided for diffusing the light pulses provided by a strobe lamp and directing those light pulses onto a selected portion of the tipping paper.

The vision processing system may be employed to determine the average area of plural perforations located in illuminated portions of the running tipping paper strip. This determination is accomplished in one embodiment by counting pixels within the image of three to six perforations and converting this number into an equivalent area. Alternatively, a more sophisticated vision processing system may be employed which analyses optical features within the field of the camera and determines width, length and spacing of the perforations illuminated by the strobe light.

Perforation area data obtained from the vision processing system may be further processed to calculate expected pressure drop of the tipping paper. The dimensional and pressure drop data may also be displayed at a production line console to provide continuous monitoring of the perforation operation. Calculated pressure drop for the perforated paper may be compared with a pressure drop specification for the particular type and brand of smoking product in which the tipping paper is to be used. Deviations from the specification may be noted on the display or may be used to trigger an alarm.

Another preferred embodiment of the present invention employs a CCD line sensor with plural sensor cells located across a width of the tipping paper strip. An illumination device is provided to constantly illuminate an area of the strip of tipping paper opposite the CCD line sensor. The sensor cells are periodically scanned to obtain signals representative of a profile of the optical transmission of the tipping paper across the width of the strip. Advantageously, the scanning operation can be performed at least 200 times per second. At such a speed the individual sensor cells of the CCD line sensor sum or integrate the incident light received throughout the paper which passes by each cell between scans.

The profile signals may be processed to obtain additional signals: (1) a signal related in value to characteristics of the base sheet such as thickness and (2) signals related in value to the average area of perforations in one or more lines of perforation being formed in the tipping paper. In a preferred embodiment the first signal is a signal related in value to the level of light transmission through unperforated portions of the strip. The second signal is a signal related in value to the difference between the detected level of light transmission through the unperforated portions of the strip and the level of light transmission at the location of the one or more lines of perforations in the strip. The second signal may be further processed to provide a signal related in value to an expected pressure drop across the tipping paper. This pressure drop signal may be displayed or used to control the operation of the perforator to ensure consistency in the tipping paper produced by the production line.

BRIEF DESCRIPTION OF THE DRAWINGS

FIG. 4a is a schematic perspective drawing illustrating the operation of a continuous linescan perforation monitoring apparatus.

FIG. 4b is a graph of an optical transmission profile of a type which may be obtained using the continuous linescan perforation monitoring apparatus of FIG. 4a.

DETAILED DESCRIPTION OF PREFERRED EMBODIMENTS

Figure 1:
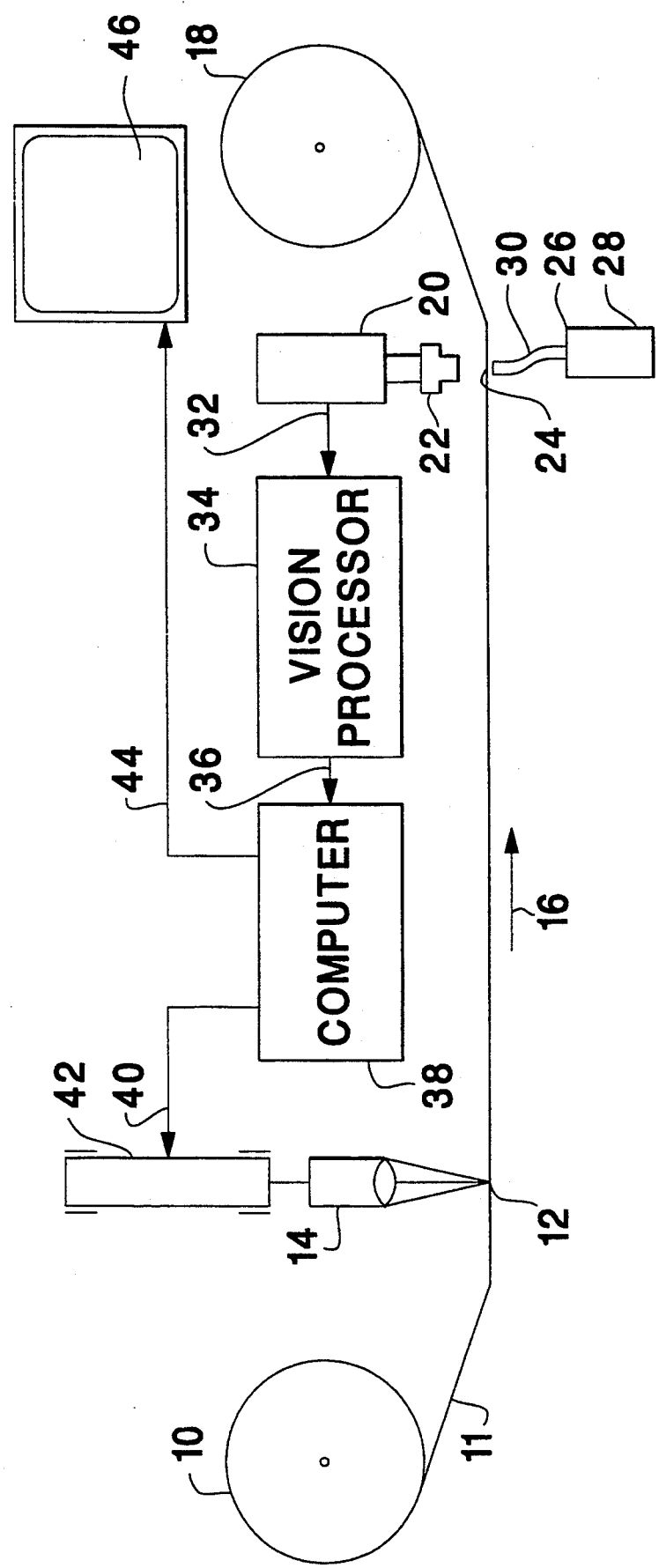
FIG. 1 is a schematic diagram of a system for perforating a tipping paper strip including an electro-optical system for monitoring the perforations, displaying information concerning the operation of the system and controlling the perforator.

The present invention may be employed on a production line which produces perforated tipping paper for the control of dilution of cigarettes and other smoking products. Such a production line is shown in schematic form in FIG. 1. Unperforated tipping paper is provided by a bobbin 10. The tipping paper strip 11 from the bobbin 10 is perforated at location 12 by a perforation device such as a laser beam perforator 14. The perforated paper strip then travels in the direction of movement indicated by the arrow 16 and is wound on a takeup bobbin 18. The production line as thus far described is known in the prior art.

It is also known that pressure drop through the tipping paper is related to the area of the holes in the tipping paper. See R. W. Dwyer, K. A. Cox, and J. E. Bickett, "Sources of Pressure Drop and Ventilation Variability in Cigarettes," in Recent Advances in Tobacco Science, Vol. 13 Ed. Dale E. Mathis, (Greensboro, N. C.: Tobacco Chemists Research Conference, 1987), p. 95. In this paper an equation is provided for determining pressure drop. That equation is of the form:

$$P = K^*(Q/A)^2 \qquad (1)$$

wherein P=pressure drop of tipping paper, K=constant=$1.58 \times 10^{-6}$, Q=PDI flow rate=17.5 CC per minute and A=total area exposed to flow.

Applicants have developed a system for measuring perforation area of a rapidly moving strip of tipping paper and have further determined that pressure drop calculated from the measured average perforation area, using appropriate constants, correlates to a high degree with actual, pneumatically measured, pressure drop. A system by which this is accomplished will now be described.

With continued reference to FIG. 1, one or more perforation inspection cameras 20 are located adjacent the running strip of tipping paper 11. In a preferred embodiment these cameras are CCD (charged coupled device) based cameras. The camera 20 is outfitted with a microscope lens 22. The microscope lens is selected to have sufficient field and magnification to image from 3 to 6 perforations at a time.

The camera 20 is directed at a portion 24 of the moving web of tipping paper. A strobe light is located opposite the camera lens for intermittently illuminating the opposite site of the perforated tipping paper portion 24. The strobe light 26 may include a strobe lamp assembly 28 and an optical fiber delivery system 30. The fiber optic cable 30 diffuses the light pulses from the lamp assembly and directs the light pulses onto the precise portion of the tipping paper web desired to be illuminated.

An image data signal 32 from the camera is applied to a vision processor 34. In the preferred embodiment of the present invention the vision processor is a commercial machine vision system, in particular, an Allen Bradley CVIM I or CVIM II Vision System. The machine vision processor 34 may determine the area of perforations by counting pixels within the image of each perforation. Alternatively, the vision processing algorithm involves recognition of the shapes presented by the camera 20 and a determination of width, length and spacing of the perforations.

A perforation data signal 36 from the vision processor 34 may be applied to the input port of a computer 38. The computer 38 may be a special purpose computer or a general purpose digital computer such as an INTEL 486 TM microprocessor-based personal computer. The computer 38 may employ equation 1 above to calculate expected pressure drop from the data provided by the vision processor. In addition the computer may provide a control signal 40 for controlling the power output of the resonator 42 of the laser perforator 14 upstream from the camera 20. The computer may also provide data in the form of a display signal 44. Data concerning perforation dimensions or calculated pressure drop may be displayed essentially instantaneously on a display screen 46 located at the production line. The displayed information may be used by production line operators or inspectors to monitor the perforation process.

Figure 2A:
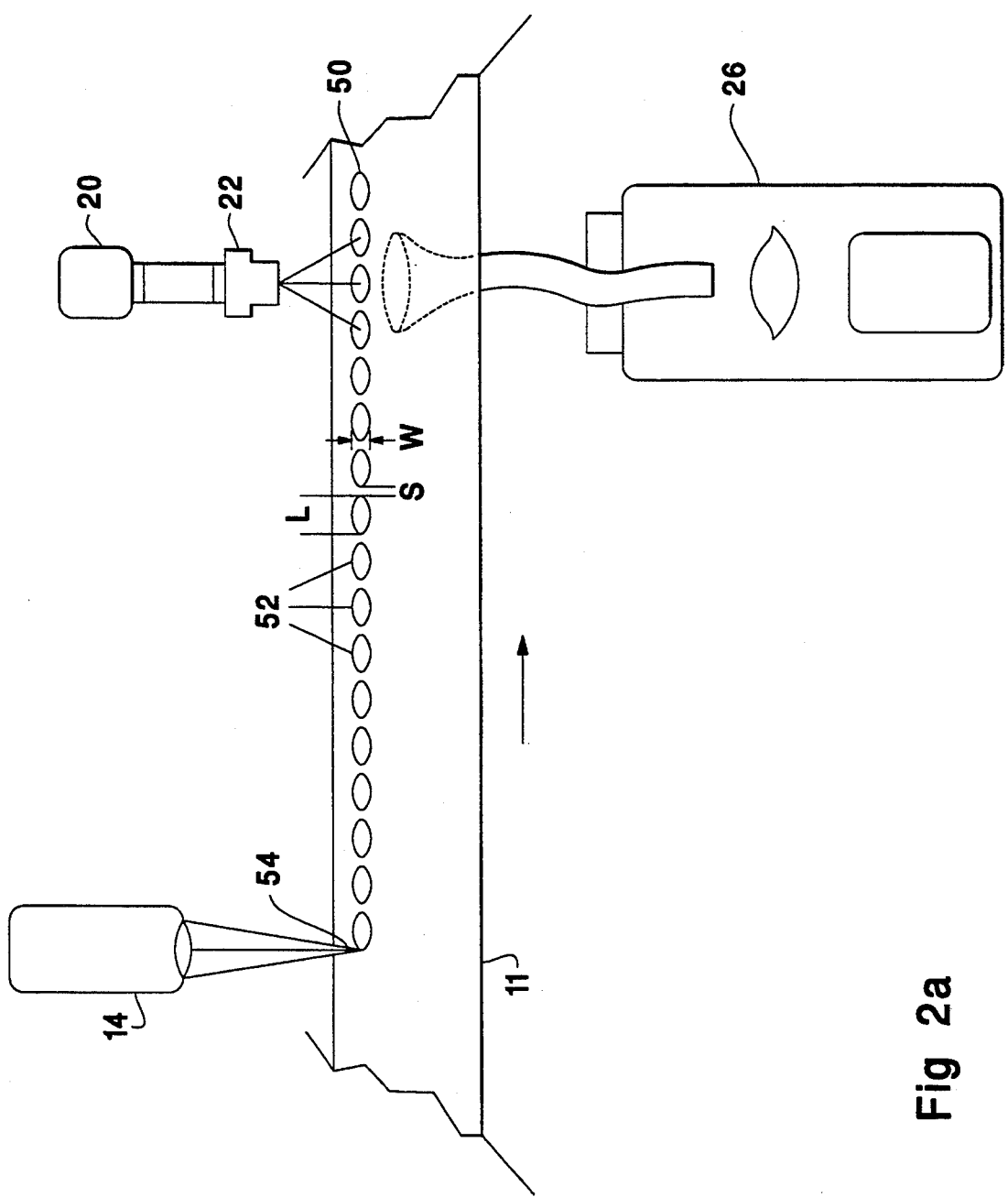
FIG. 2a is a schematic perspective drawing of a portion of the apparatus shown in FIG. 1.
Figure 2B:
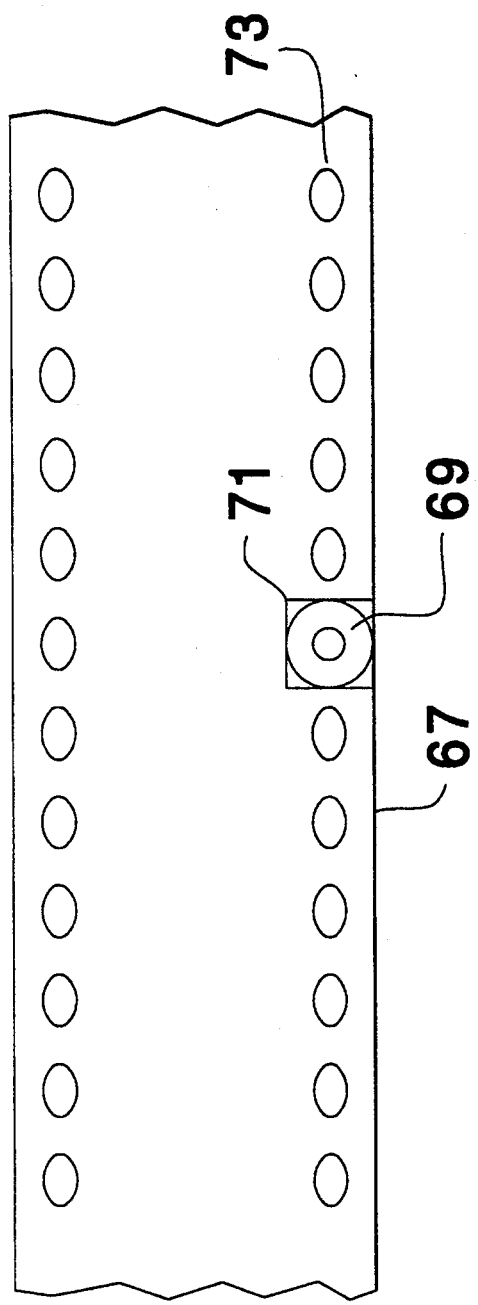
FIG. 2b is a plan view of a calibration standard for the system of FIG. 1.

FIG. 2a is a schematic diagram of a portion of the apparatus shown in FIG. 1. In FIG. 2a, the strip of tipping paper web 11 is enlarged and drawn in perspective. The web shown in the Figure has a single line 50 of perforations 52. The perforations 52 are formed by the laser beam incident at location 54. It should be understood that a perforation apparatus may be employed which produces more than one line of holes in the tipping paper web. Such a web is shown in FIG. 2b. For example, two parallel lines of perforations may be provided in a single web and the web subsequently bilaterally split to form two separate strips of tipping paper each having a single line of perforations. In a situation where more than one line of perforations is formed in the tipping paper more than one camera 20 may be required. In this case, advantageously, a single lamp source illuminates fiber optic cables equal in number to the number of lines being illuminated. This approach tends to improve the uniformity of illumination from line to line.

With continued reference to FIG. 2a, the perforations 52 are shown as having a characteristic length L spacing S and width W. As discussed above, these dimensions may be measured by the system.

FIG. 2b illustrates a standard for calibrating the system of FIG. 1. A portion 67 of the tipping paper strip is shown in plan view in the figure. One or more annular washers 69, for example, 0.05 inch in diameter, are attached to the strip with a piece of clear masking tape 71. The washer is located in the approximate position of one of the perforations in a line 73 of perforations. The strip portion 67 is located between the camera and light source and calibrated using the known area of the hole in the washer as a standard.

Figure 3:
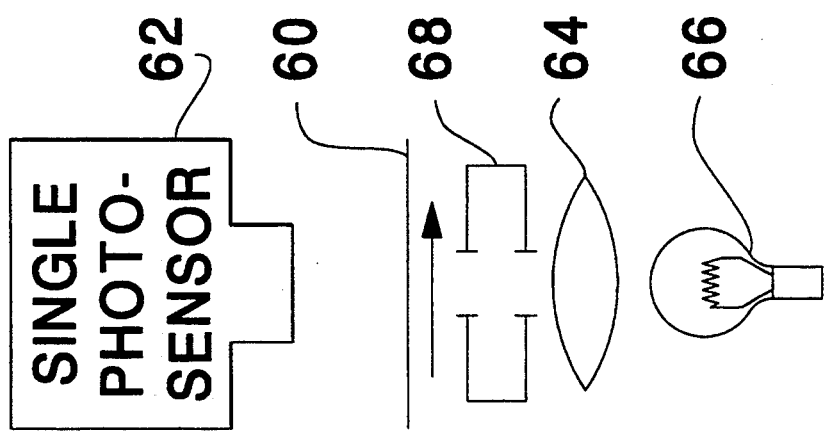
FIG. 3 is a schematic drawing of a prior art single photo-sensor system for monitoring a web of tipping paper.

FIG. 3 is a schematic drawing of a prior art single cell sensor for monitoring a web of tipping paper. In this prior art system a moving web of tipping paper 60 passes between a single photodetector 62 and a light source 64. The light source may include a lamp 66 and a collimator 68. This system averages the transmission of light across the strip of tipping paper. While such a system can generally measure transmission through the moving strip of tipping paper, it has been found inadequate to accurately measure perforation area and has been found to be effected by other process variables such as the thickness of the unperforated portion of the base sheet of tipping paper.

FIGS. 4a and 4b relate to an alternative embodiment of the present invention employing a CCD line sensor 76. In FIG. 4a, a perforated strip of tipping paper 70 is shown in perspective. The tipping paper is moving rapidly through the system in the direction indicated by the arrow 72. A source of illumination 74 constantly and uniformly illuminates a portion of the perforated tipping paper as it moves past the line sensor.

The CCD line sensor 76 is located on the opposite side of the strip or web 70 from the illumination device 74. The CCD line sensor 76 is shown as having plural sensor cells 78 each sensitive to a different portion of the optical field across the width of the paper strip.

The sensor cells 78 are periodically scanned by the scanning circuit 80 to obtain signals representative of a profile of the optical transmission of the tipping paper across the width of the strip. Such a profile is shown in the graph of FIG. 4b. Light incident on the CCD sensor cells is effectively integrated between sensor scans. Each scan produces a light transmission profile across the strip. Peaks will occur where the perforations lines are present, and the areas between the peaks represent the light transmitted through the unperforated paper base sheet. If perforation holes are skipped or not present, the peak will decrease toward the base sheet level. If the base sheet changes in thickness or opacity, the average level of the base sheet will increase. By analyzing the output signals of the line scan sensor, variations in the base sheet can be detected such as splices and changes in composition of the base sheet. The line sensor can scan from 200 to 1000 times per second. The CCD cells accumulate charge between scans approximately proportional to the number of incident photons. In this way, the cells integrate the light on the detectors between scans. Since transmitted light is integrated between scans, all perforations that pass the detector between scans add to the voltage level detected for the cell corresponding to that portion of the strip. In this way continuous monitoring is achieved and, generally, every perforation contributes to the measurement obtained with the system.

In the profile of FIG. 4b, cells responsive solely to light transmitted through unperforated portions of the web produce a baseline voltage level V at locations 82, proportionally related to the thickness of the tipping paper strip. A shift in this baseline may indicate a change in thickness of the tipping paper or the presence of a splice in the tipping paper. Also a change in this portion of the profile may represent undesired tears or holes in the tipping paper strips. Sensors in the regions of the lines of perforation in the tipping paper produce the peak portions 84 in the profile.

An output signal from the scanning circuit 80 is applied to a processing circuit 86. In the processing circuit, a first signal may be derived based on the level of light transmission through unperforated portions of this strip indicated by the voltage level V shown. A second signal may be provided indicative of the average area of the perforations by summing the area under the peaks 84 and subtracting the background level voltage V. A pressure drop value is then calculated from the second signal. These signals provide a basis for monitoring and controlling the operation of the perforators in the line. A control signal may be produced to control the operation of the perforator as in the apparatus of FIG. 1.

Variations of the method and apparatus disclosed here are possible without departing from the spirit of the present invention. The invention sought to be protected is defined by the following claims including their appropriate range of equivalents.

What is claimed is:

1. An apparatus for controlling a tipping paper perforator comprising:
   strobe light for intermittently illuminating a portion of perforated tipping paper continuously moving in the apparatus;
   camera means for providing image data for perforations in the portion of the tipping paper illuminated by the strobe light;
   vision processing means for determining the area of perforations in the tipping paper; and
   means for calculating a pressure drop of the paper using the area determined for the perforations in the tipping paper and for producing a control signal for controlling the perforator responsive to the calculated pressure drop.

2. The apparatus of claim 1, wherein the means for calculating the pressure drop and producing the control signal calculates the pressure drop using an equation relating calculated pressure drop to the inverse square of average perforation area.

3. The apparatus of claim 2, wherein the calculated pressure drop is calculated using the following equation:

$$P = K*(Q/A)^2$$

wherein
P = pressure drop of tipping paper,
K = constant,
Q = Flow Rate, and
A = average area.

4. The apparatus of claim 3 wherein K is $1.58 \times 10^{-6}$ and Q is 17.5 cc/min.

5. The apparatus of claim 1, further comprising means for moving the tipping paper at a speed greater than 5000 ft/min.

6. The apparatus of claim 5, wherein the strobe light and camera means are located on opposite sides of the tipping paper and the camera detects light transmitted through the perforations in the tipping paper.

7. The apparatus of claim 1 wherein the vision processing means determines the area of perforation by counting pixels within the image of each perforation.

8. The apparatus of claim 1, wherein the strobe lamp produces light pulses of less than 500 nanosecond duration.

9. The apparatus of claim 8, further comprising a fiber optic cable for diffusing the light pulses from the strobe light and directing the light pulses onto the tipping paper.

10. The apparatus of claim 1, wherein at least 10 images per second are processed by the vision processing means and wherein an average area is calculated from a sample of at least 100 holes.

11. The apparatus of claim 1, wherein the camera means is a CCD camera equipped with a microscope lens having sufficient field and magnification to image from 3 to 6 perforations at a time.

12. The apparatus of claim 1, wherein said vision processing means includes means for determining the width, length and spacing of the perforations and wherein the apparatus further comprises a display means for displaying information concerning the tipping paper perforation in real time.

13. The apparatus of claim 1 wherein said signal producing means compares the calculated pressure drop with a pressure drop specification.

14. An apparatus for real time monitoring of perforations in tipping paper moving in strip form in a production line comprising:
   means for directing light pulses at a portion of the tipping paper which includes perforations;
   means for detecting the area of perforations and producing an area signal which is a function of said area;
   means for receiving said area signal and for producing a pressure drop signal which is an inverse square function of said area signal.

15. The apparatus of claim 14, further comprising a device for controlling the power output of a laser perforator which is perforating tipping paper upstream of the detecting means in response to said pressure drop signal.

16. The apparatus of claim 14, further comprising means for displaying a pressure drop responsive to said pressure drop signal.

17. The apparatus of claim 14, further comprising means for comparing the pressure drop signal with a pressure drop specification, and for producing an alarm when the calculated pressure drop signal deviates from the pressure drop specification by more than a predetermined amount.

18. A method for controlled perforating of a running elongated strip of tipping paper comprising:
   perforating the tipping paper with a laser beam perforator;
   imaging the perforations in the tipping paper downstream of the perforator;
   determining the area of perforations imaged;
   calculating an expected pressure drop from the determined area and producing a signal which is a function expected pressure drop; and
   controlling the power output of the laser beam perforator in response to the pressure drop signal.

19. The method of claim 18, wherein the step of imaging the perforation includes the steps of
   illuminating between three and six perforations in the running strip of tipping paper with pulses of light sufficiently short in duration to freeze the motion of the running tipping paper; and
   detecting the light transmitted through the illuminated perforations in the tipping paper with a camera.

20. The method of claim 19, wherein the strip runs at a speed in excess of 5000 ft. per minute and the duration of each light pulse is less than 500 nanoseconds.

21. The method of claim 18, wherein the pressure drop signal is calculated in accordance with the following relationship:

$$P = K*(Q/A)^2$$

wherein
P = pressure drop of tipping paper,
K = constant,
Q = Flow Rate, and
A = average area.

22. An apparatus for monitoring of tipping paper having one or more lines of perforations in a base paper strip moving through the apparatus comprising:
   a CCD line sensor with plural sensor cells located across a width of the tipping paper strip;
   means for illuminating the tipping paper strip with a constant, essentially uniform light in an area on the opposite side of the strip from the CCD line sensor;

means for scanning the sensor cells to obtain sensor cell signals representative of a profile of the optical transmission of the tipping paper across the width of the strip;

means responsive to said sensor cell signals for providing a first signal which is indicative of a characteristic of the base paper strip and a second signal which is indicative of the average area of perforations in the one or more lines; and means for calculating an expected pressure drop from said second signal and providing a third signal indicative of said calculated pressure drop.

23. The apparatus of claim 22, wherein the first signal is a function of the level of light transmission through unperforated portions of the strip and wherein the second signal is a function of the difference between the detected level of light transmission through the unperforated portion of the strip and the level of light transmission at the location of the one or more lines of perforations.

24. The apparatus of claim 22, wherein the third signal controls a laser perforator producing perforations in the tipping paper upstream of the CCD line sensor.

25. The apparatus of claim 22, wherein the scanning means scans the tipping paper strip at least 200 times per second.

* * * * *